US005587854A

United States Patent [19]
Sato et al.

[11] Patent Number: 5,587,854
[45] Date of Patent: Dec. 24, 1996

[54] CASE UNIT HAVING A DUAL CASE STRUCTURE FORMED BY AN OUTER CASE MEMBER AND AN INNER CASE MEMBER FOR A DISK STORAGE APPARATUS

[75] Inventors: Toshikuni Sato, Kawasaki; Masaya Agematsu, Tokyo, both of Japan

[73] Assignee: Kabushiki Kaisha Toshiba, Kawasaki, Japan

[21] Appl. No.: 288,727

[22] Filed: May 15, 1994

[30] Foreign Application Priority Data

Aug. 16, 1993 [JP] Japan .................... 5-202283

[51] Int. Cl.⁶ .................... G11B 5/012; H05K 7/12; H05K 7/14
[52] U.S. Cl. .................... 360/97.01; 361/683; 361/726
[58] Field of Search ............... 360/97.01; 361/683–685, 361/724–727, 747

[56] References Cited

U.S. PATENT DOCUMENTS

| | | | |
|---|---|---|---|
| 4,749,164 | 6/1988 | Leo et al. .................... | 248/674 |
| 4,941,841 | 7/1990 | Darden et al. .................... | 439/377 |
| 4,960,384 | 10/1990 | Singer et al. .................... | 439/155 |
| 4,982,303 | 1/1991 | Krenz . | |
| 5,010,426 | 4/1991 | Krenz .................... | 360/97.01 |
| 5,045,960 | 9/1991 | Eding .................... | 360/97.01 |
| 5,107,400 | 4/1992 | Kobayashi .................... | 361/685 |
| 5,122,914 | 6/1992 | Hanson . | |
| 5,149,048 | 9/1992 | Morehouse et al. .................... | 360/97.02 |
| 5,280,398 | 1/1994 | Wade et al. .................... | 360/98.01 |
| 5,319,519 | 6/1994 | Sheppard et al. .................... | 361/685 |
| 5,442,513 | 8/1995 | Lo .................... | 361/685 |

FOREIGN PATENT DOCUMENTS

| | | |
|---|---|---|
| 59-168981 | 9/1984 | Japan . |
| 1-319194 | 12/1989 | Japan . |
| 2-223088 | 9/1990 | Japan . |

*Primary Examiner*—Robert S. Tupper
*Assistant Examiner*—Brian E. Miller
*Attorney, Agent, or Firm*—Oblon, Spivak, McClelland, Maier & Neustadt, P.C.

[57] ABSTRACT

HDD detachable from a computer body is contained in a double-structured case unit having an inner case member and an outer case member. The case unit comprises a first lock mechanism for locking HDD contained in the inner case member, and a second lock mechanism for locking the inner case member contained in the outer case member. For connecting HDD to the computer body, the inner case member is pushed from the outer case member to an outer unit by a guide mechanism. By the release of the first lock mechanism, HDD taken out from the inner case member is inserted to a slot of the computer body, and connected to the computer body through a connector.

5 Claims, 14 Drawing Sheets

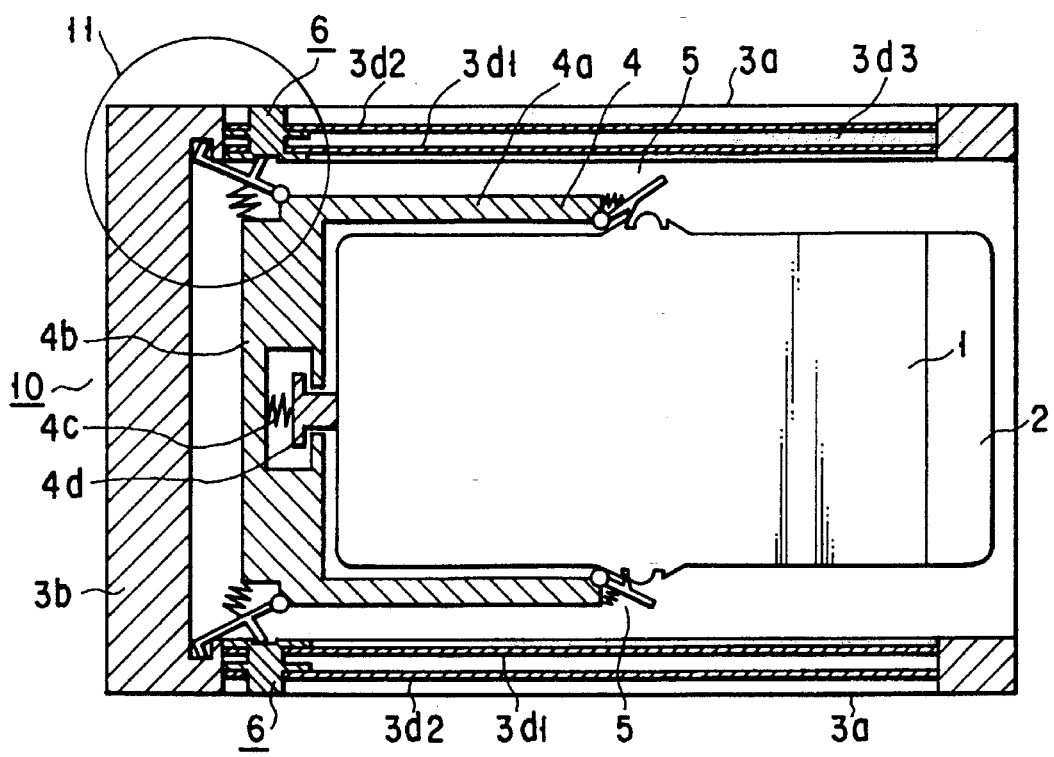
F I G. 2A
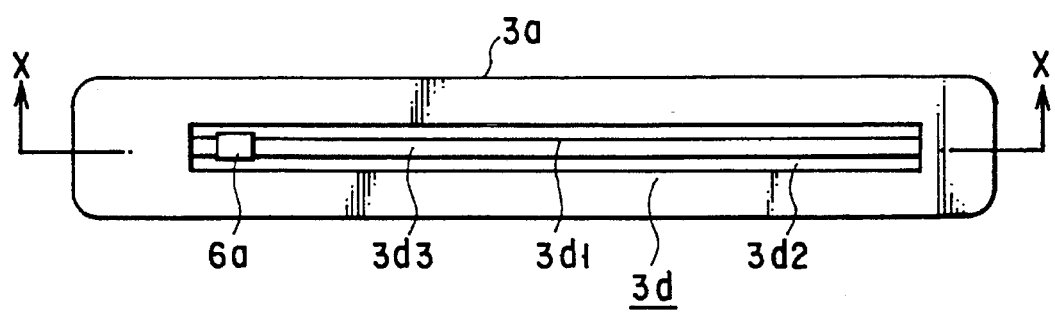
F I G. 2B

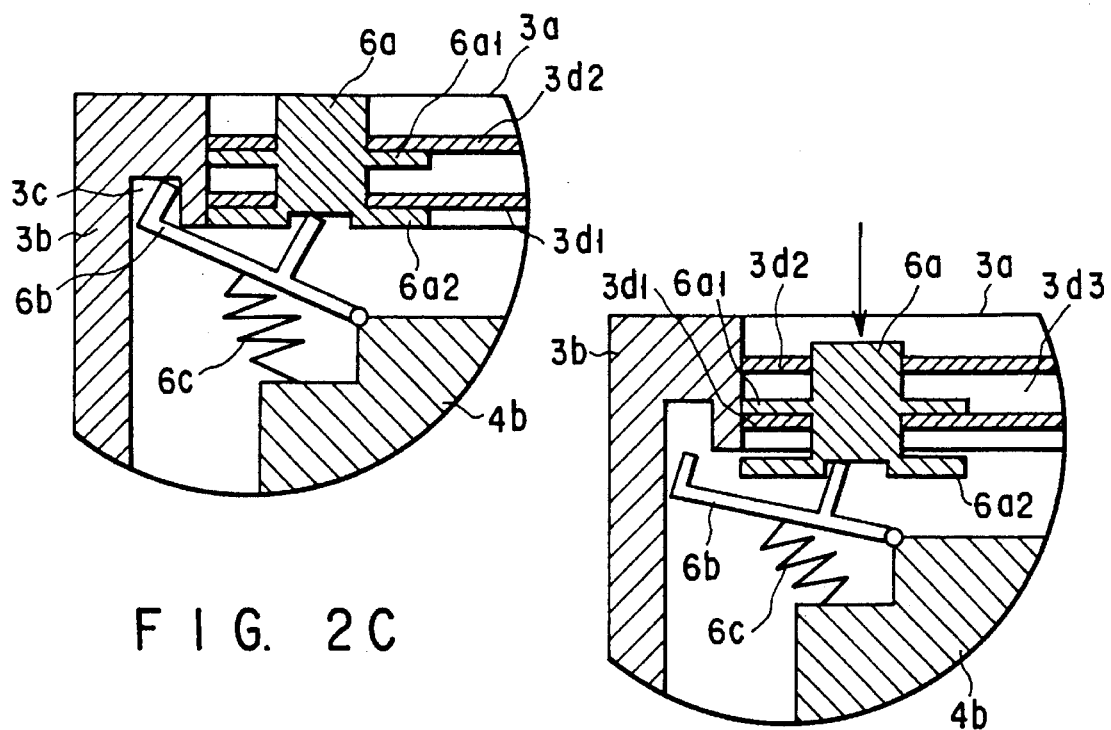
FIG. 2C
FIG. 2D
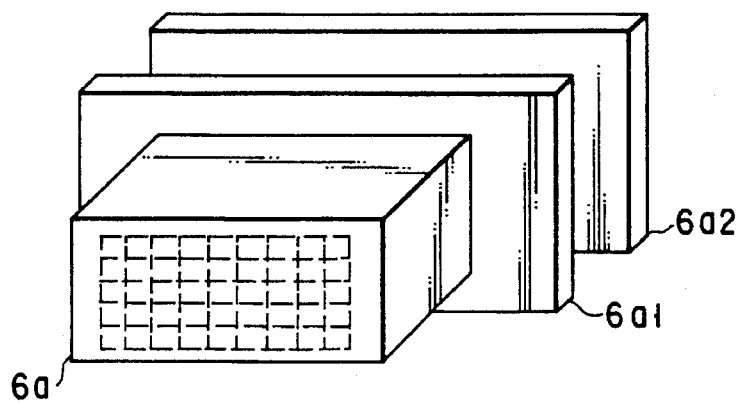
FIG. 2E

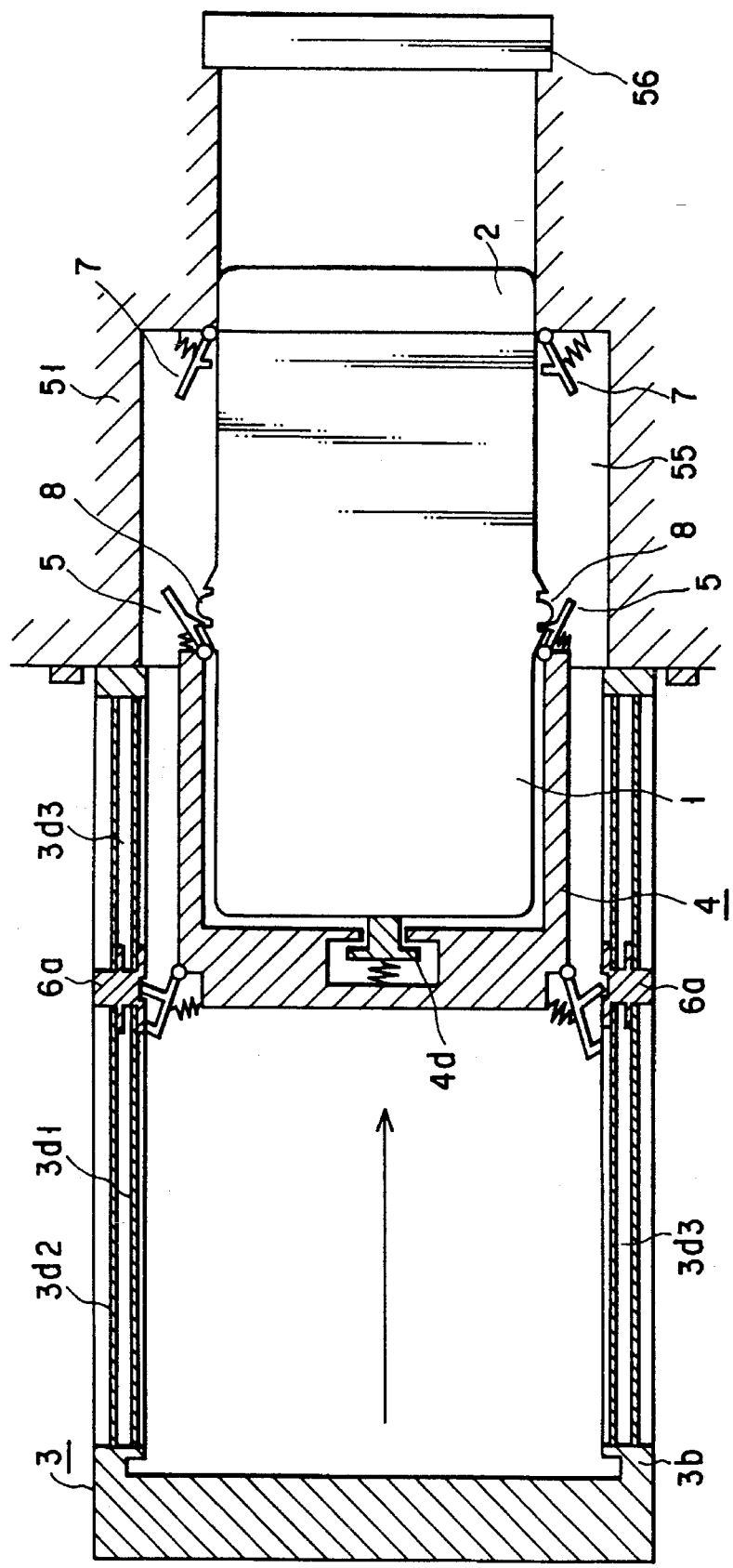
F I G. 3

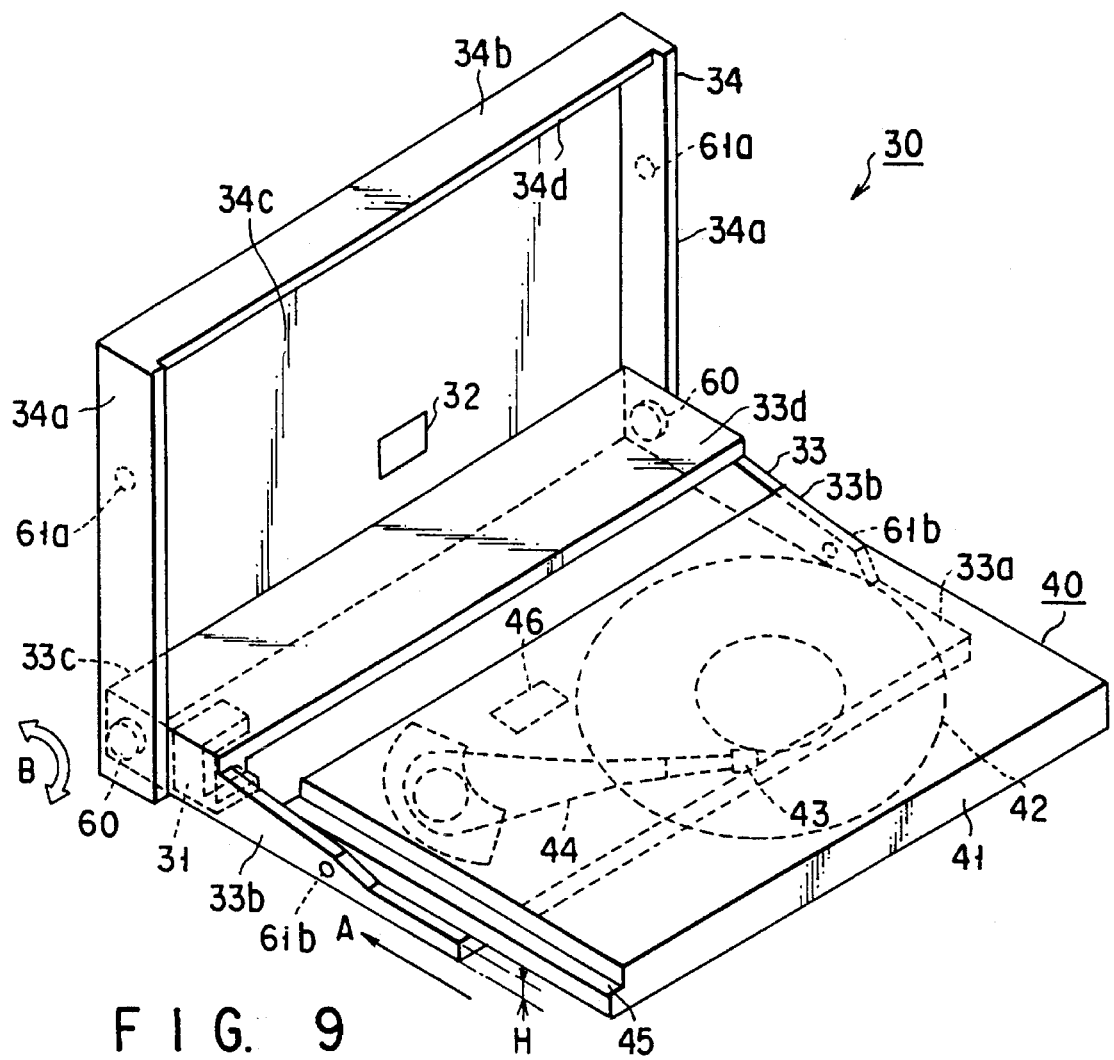
F I G. 9
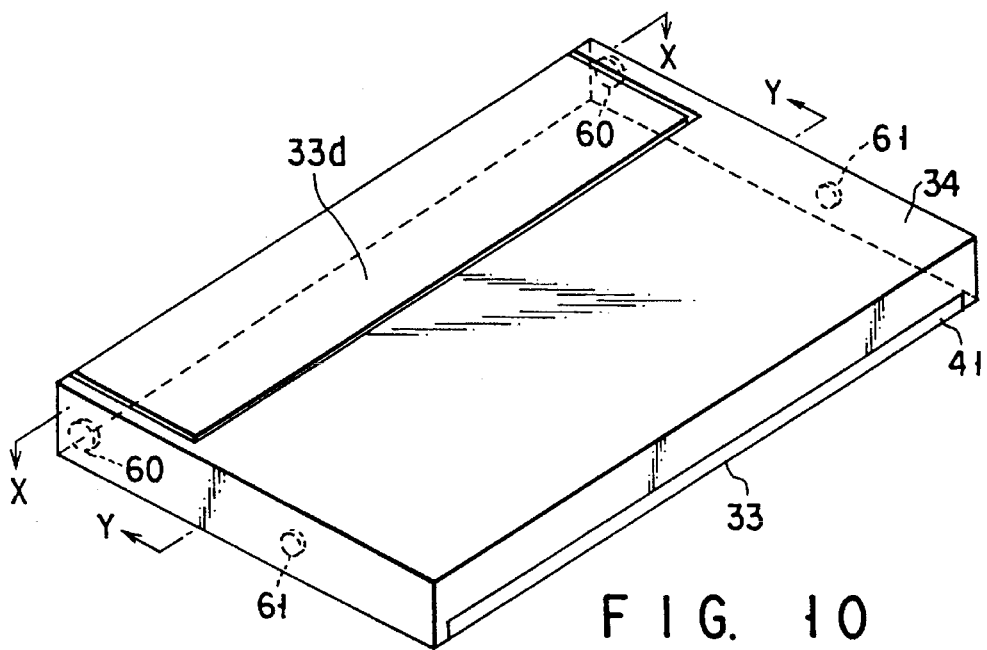
F I G. 10

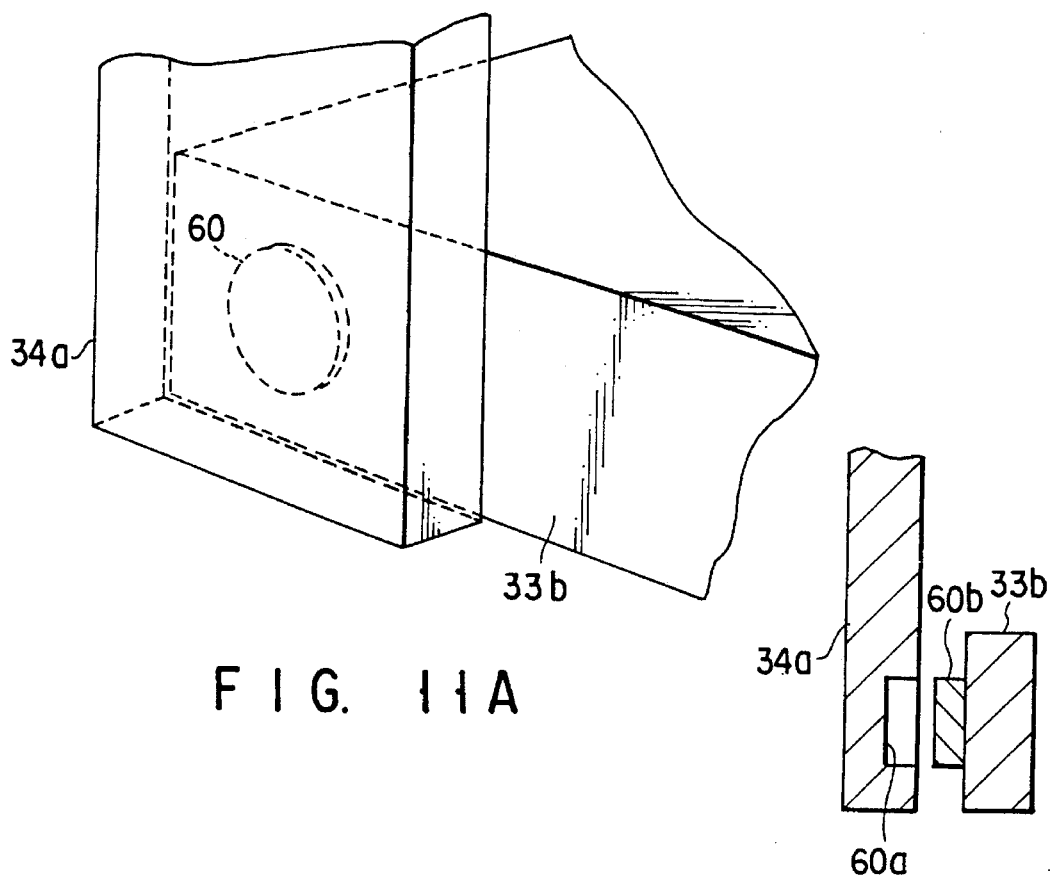
F I G. 11A
F I G. 11B
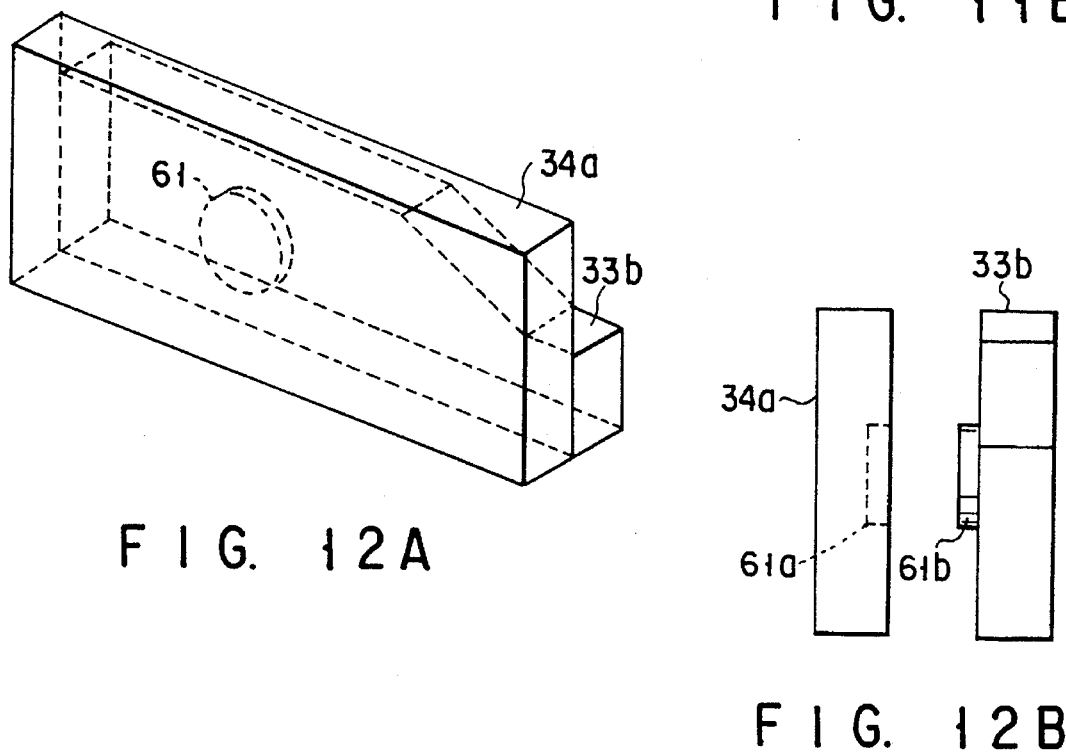
F I G. 12A
F I G. 12B

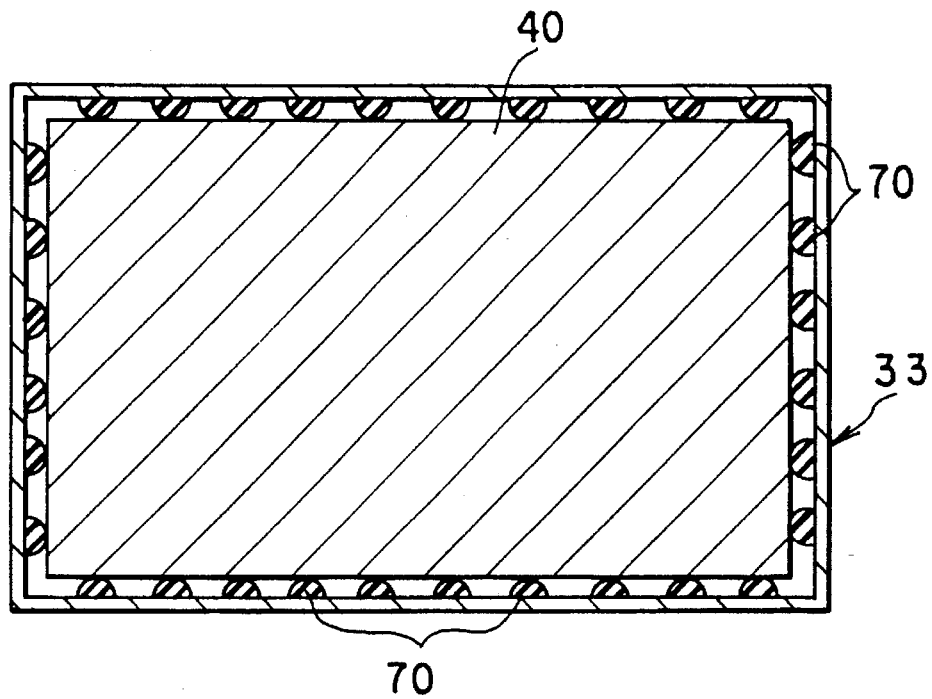
F I G. 13A
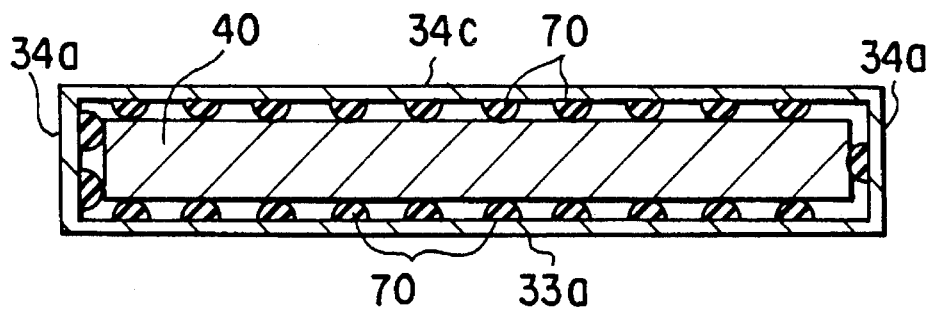
F I G. 13B

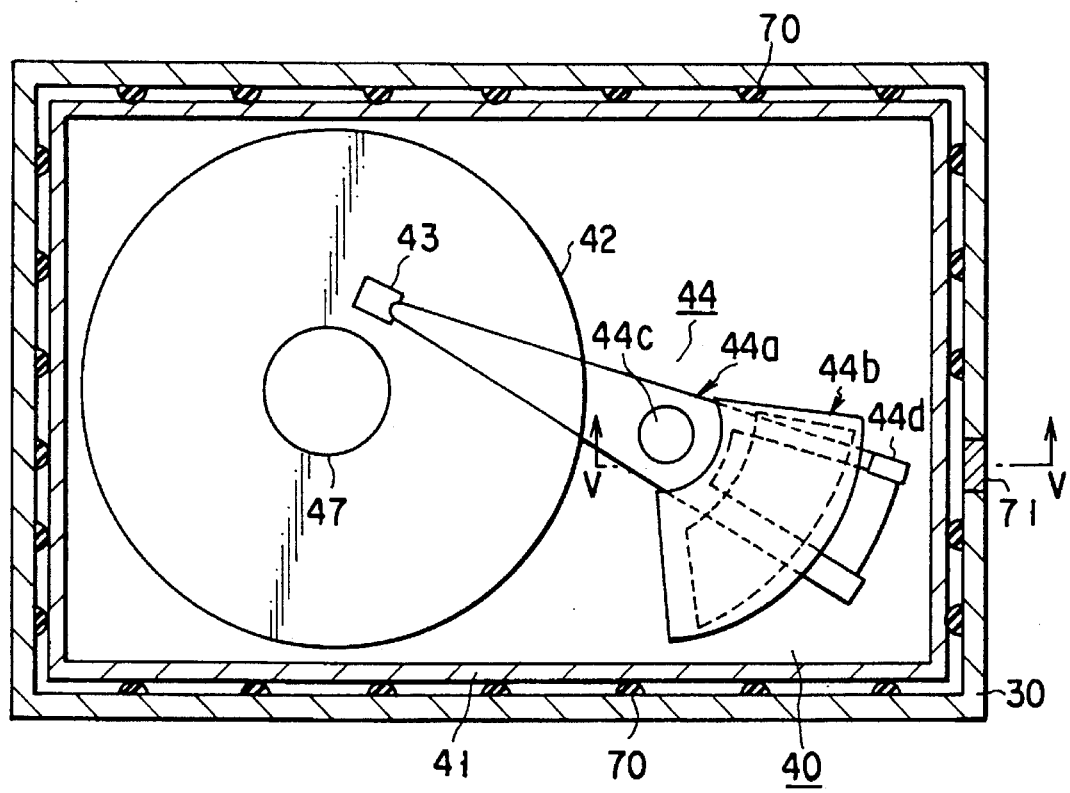
F I G. 14A
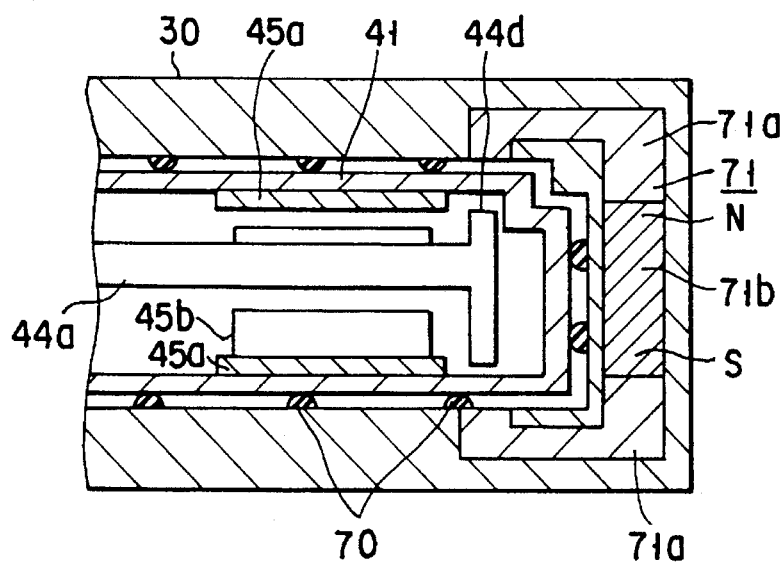
F I G. 14B

CASE UNIT HAVING A DUAL CASE STRUCTURE FORMED BY AN OUTER CASE MEMBER AND AN INNER CASE MEMBER FOR A DISK STORAGE APPARATUS

BACKGROUND OF THE INVENTION

1. Field of the Invention

The present invention relates to a case unit for storing disk storing apparatus such as a small-sized hard disk device or an optical disk apparatus and mainly protecting the apparatus against external impact, and more particularly to a disk storage unit wherein a disk drive contained in a case to be detachable from a computer body.

2. Description of the Related Art

Conventionally, in a data processor such as a personal computer, there is an apparatus using a disk storage apparatus such as a detachable small-sized hard disk device (HDD) or an optical disk apparatus as an external storage apparatus other than a small-sized HDD provided in a computer body.

The detachable small-sized HDD is a portable disk storage unit. Such a HDD is inserted to a dedicated slot provided in the computer body to be connected to the computer body. A connector is provided in the disk storage unit, and the connector is connected to a computer's connector provided in the inside of the dedicated slot.

Unlike a semiconductor memory device, since HDD has a mechanical mechanism such as a rotation mechanism for rotating the disk and a carriage mechanism for moving a head, there is needed impact resistance structure for relaxing or absorbing external impact. Particularly, the detachable HDD is removed from the computer body, and often brought to a place where the surroundings of the HDD are not always good. Due to this, it is needed that the HDD be sufficiently protected from external impact and magnetic noise generated from an outer unit.

Therefore, there can be considered a portable case for protecting HDD. However, protection from impact is not always sufficiently made by a simple case. Moreover, in a case that HDD is removed from the case and connected to the computer body, a safety measure in dealing with HDD is not sufficiently provided. For example, there is a case that HDD is often dropped. Also, in a case that the HDD is removed from the computer body and contained in the case, the safety measure in dealing with HDD is not sufficiently provided.

On the other hand, if the detachment of the HDD from the case is made complicated in order to obtain the safety measure, the operation of connecting HDD to the computer body becomes complicated, so that there occurs a problem in view of the practical use.

SUMMARY OF THE INVENTION

A first object of the present invention is to provide a case unit, which can surely protect a disk storage apparatus against external impact. A second object of the present invention is to provide a case unit, which can sufficiently ensure safety in storing or detaching the disk storage apparatus and which can detach the disk storage apparatus to be connected to a computer body of a computer by a simple operation, and a disk storage unit contained in the case unit.

The case unit of the present invention is a double-structured case comprising an inner case member for storing a disk storage apparatus and an outer case member for storing an inner case member. Further, the case unit of the present invention comprises a first lock mechanism for removably fixing the inner case member to the disk storage apparatus, and a second lock mechanism for fixing the inner case member to the outer case member in such a manner that the inner case member is movable. According to the present invention, the disk storage apparatus can be surely contained in the double-structured case by the first and second lock mechanisms. Moreover, the disk storage apparatus can be easily taken out from the case.

The disk storage unit of the present invention comprises connector means for connecting a disk drive contained in the double-structured case unit to the computer body, and a disk lock mechanism for removably fixing the computer body to the disk drive. The case unit has a guide mechanism for pushing the inner case to the outside from the outer case. The disk drive contained in the inner case pushed from the outer case by the guide mechanism is connected to the computer body through connector means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a plane view explaining the structure of a case unit of the present invention;

FIG. 2B is a side view explaining the structure of the case unit of the present invention;

FIG. 2C and FIG. 2D are partially enlarged views of FIG.

FIG. 2E is a perspective view of a lock bottom of the case unit of the present invention;

FIG. 3 is a plane view explaining an operation of a disk storage unit of the present invention;

FIGS. 9 and 10 are perspective views explaining the structure of the case unit of the present invention;

FIG. 11A is an exploded perspective view explaining the partial structure of the case unit of the present invention;

FIG. 11B is an exploded perspective view explaining the partial structure of the case unit of the present invention;

FIG. 12A is an exploded perspective view explaining the partial structure of the case unit of the present invention;

FIG. 12B is an exploded perspective view explaining the partial structure of the case unit of the present invention;

FIG. 13A is a cross sectional view taken along line X—X of FIG. 10;

FIG. 13B is a cross sectional view taken along line Y—Y of FIG. 10;

FIG. 14A is a plane view showing an internal structure of the disk storage unit of the present invention;

FIG. 14B is a cross sectional view showing an internal structure of the disk storage unit of the present invention;

DETAILED DESCRIPTION OF THE PREFERRED EMBODIMENTS

Embodiments of the present invention will be explained with reference to the drawings.

First Embodiment

Figure 1:
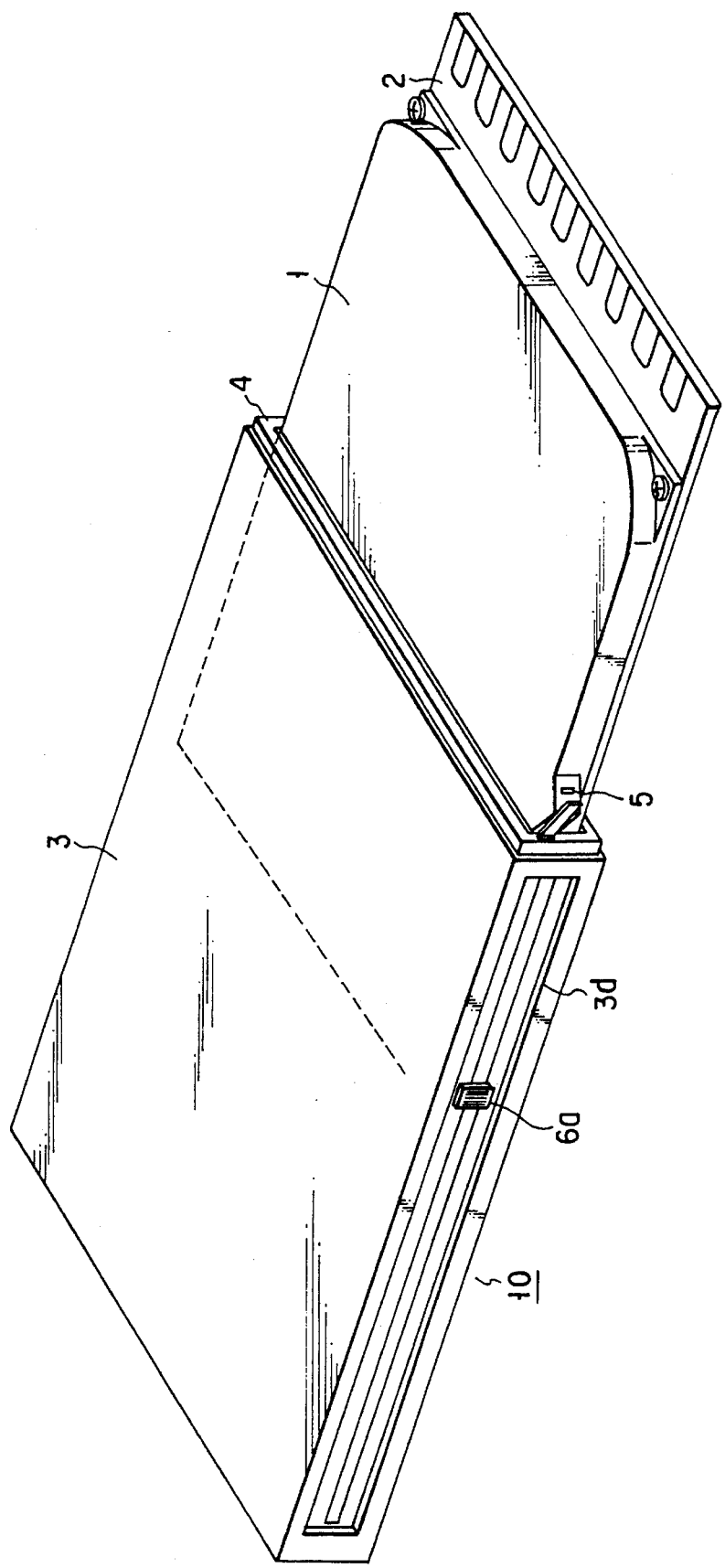
FIG. 1 is a perspective view showing an appearance of a disk storage unit of the present invention.
Figure 6A:
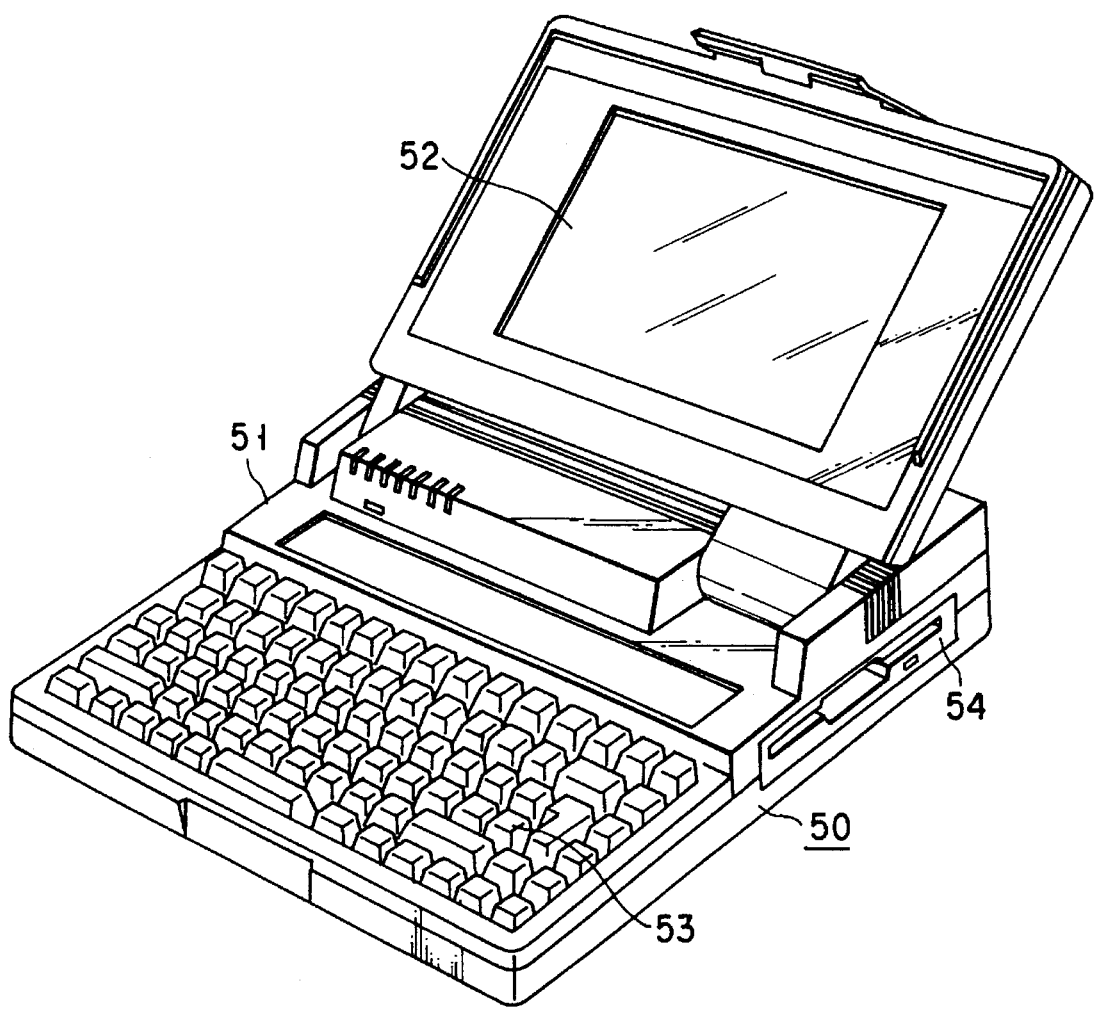
FIG. 6A is a perspective view showing an appearance of a personal computer of the present invention.

FIG. 1 shows a case unit 10 and a disk storage unit of the first embodiment of the present invention. The disk storage unit is an external storage apparatus having a structure in which a small-sized hard disk drive (HDD) 1, for example, HDD of 2.5 inch is contained in the case unit 10. In this embodiment, there is used the disk storage unit serving as an external storage apparatus detachable from a personal computer 50 of a lap top type as shown in FIG. 6A.

Figure 6B:
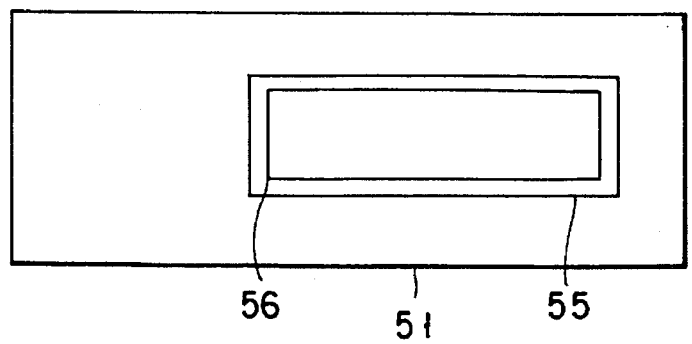
FIG. 6B is a side view showing an appearance of a personal computer of the present invention.

The personal computer 50 generally comprises a computer body 51 with a built-in CPU, a display 52, a keyboard 53, and a floppy disk device 54, which is an external storage apparatus of the standard layout. As shown in FIG. 6B, in a case that a direction of the display 52 is a front side, the computer body 51 has a slot 55 for providing the disk storage unit in a rear side. In the slot 55, there is provided a connector 56 for connecting the computer body 51 to the disk storage unit.

Figure 5A:
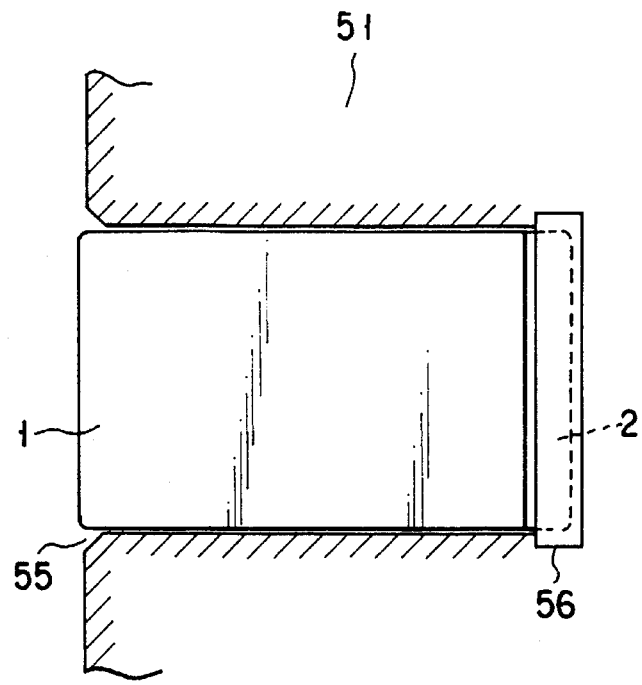
FIGS. 5A and 5B are plane views explaining the disk storage unit of the present invention.
Figure 5B:
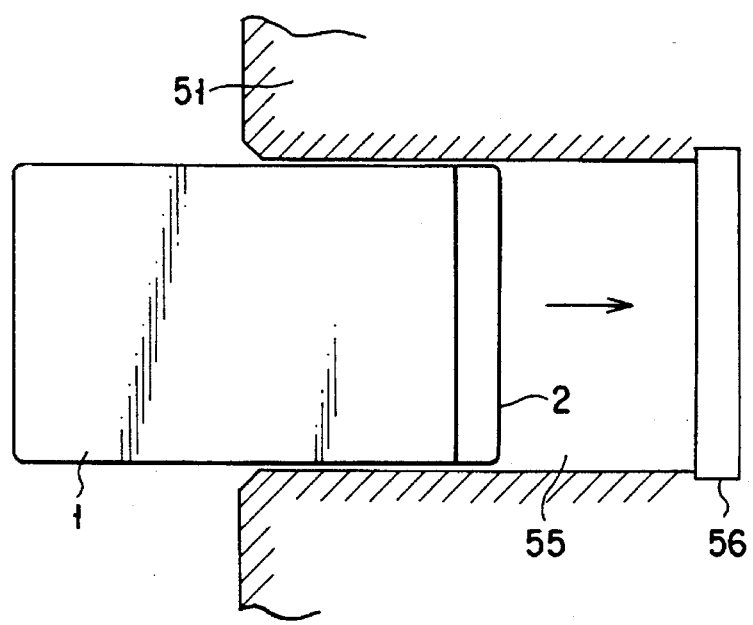

As shown in FIG. 1, the disk storage unit has a connector 2 connected to HDD 1. HDD 1 is connected to the computer body 51 through the connector 2. In a case that the disk storage unit is used as an external storage apparatus, HDD 1, which is taken out from the case unit 10, is inserted to the slot 55 of the computer body 51 as shown in FIG. 5B. As shown in FIG. 5A, HDD 1 inserted to the slot 55 is connected to the computer body 51 by coupling the connector 2 to the connector 56 of the computer body 51.

Structure of Case Unit

As shown in FIG. 1, the case unit 10 has a double structure formed of an outer case member 3 and an inner case member 4. The inner case member 4 has a box-shaped body having a cavity for containing HDD 1. Also, a first lock mechanism 5 to be described later is attached to the inner case member 4. The outer case member 3 has a box-shaped body having a cavity for containing inner case member 4. Also, on the side surface side, there are provided an element member (a lock bottom 6a) of a second lock mechanism 6 to be described later and a guide mechanism 3d.

The outer case member 3 is formed by processing a thin plate made of a magnetic material such as iron, so as to prevent HDD 1 from being influenced by a magnetic field (magnetic noise, etc.) of an outer unit. On the other hand, the inner case member 4 is formed by processing a thin plate including a shock absorber (isolation material) such as plastic or rubber to relax external impact (dropping or contact with an outer unit). In this case, the outer case member 3 may be formed by processing plastic including a magnetic material.

As shown in FIG. 2A (plane cross sectional view taken along line X—X of FIG. 2B), the inner case member 4 has a side surface portion 4a, which is a half length of the HDD 1 and which is provided on each of four faces, and a bottom portion 4b provided on only one side. On the bottom portion 4b, a shock absorbing member 4d, which is supported by a spring 4c, is provided so as to hold HDD 1 and absorb oscillation due to external impact. Moreover, an inserting port of HDD 1, which is a top end portion of the side surface portion 4a, there are provided two first lock mechanisms 5 (FIG. 4B) for removably fixing HDD 1.

The outer case member 3 is formed to have a size enough to cover the entire of HDD 1 contained in the inner case member 4, the side surface provided portion 3a on each of four faces, and the bottom portion 3b. In the inner side of the side surface portion 3a of the outer case member 3, there are provided two second lock mechanisms 6 for fixing the inner case member 4 in the vicinity of the bottom portion 3b, and for freely releasing the fixed state of the inner case member 4 in a state that the inner case member 4 is supported.

Moreover, as shown in FIG. 2B, in the side surface portions 3a of two faces opposing to each other, there is provided a guide mechanisms 3d for pushing the inner case member 4 to the outside, and moving the inner case member 4 to be contained in the inside of the external case member 3 from the outside. The guide mechanism 3d is an element member of the second lock mechanism 6, and includes two rail guides 3d1 and 3d2 and a guide groove 3d3 so as to guide the lock bottom 6a for releasing the locked state in a linear direction.

The second lock mechanism 6 comprises element members, that is, the lock bottom 6a, a lock lever 6b, and a spring 6c as shown in FIG. 2C (enlarged view of portion 11 of FIG. 2A). In the second lock mechanism 6, when the bottom portion 4b of the inner case member 4 is positioned in the vicinity of the bottom portion 3b of the outer case member 3, the inner case member 4 is fixed in the vicinity of the bottom portion 3b by the lock lever 6b acted by the spring 6c. At this time, the top end portion of the lock lever 6b is engaged with a notch portion 3c formed in the bottom portion 3b. One end of the lock lever 6b is attached to the bottom portion 4b of the inner case member 4.

One end of the spring 6c is attached to the bottom portion 4b of the inner case member 4, and drives the lock lever 6b in a direction of the notch portion 3c. As shown in FIG. 2D, if the lock bottom 6a is pressed to the inner side of the outer case member 3, the lock lever 6b is separated from the notch portion 3c of the bottom portion 3b, so that the fixed state of the inner case member 4 is released. In the released state, the inner case member 4 supported by the lock bottom 6a and the lock lever 6b is guided to be pushed outside from the outer case member 3 by the guide mechanism 3d.

As shown in FIG. 2E, in the lock bottom 6a, tongue portions 6a and 6a2 are integrally formed so as to be engaged with the guide mechanism 3d.

A stopper is formed on the surface of the lock bottom 6a so as to be depressed by a user.

As shown in FIG. 2C, in the state that the lock bottom 6a is pressed outward through the lock lever 6b by the spring 6c, the tongue member 6a1 comes in contact with the guide 3d2, and the tongue member 6a2 comes in contact with the guide 3d1. On the lock bottom 6a, there is formed a concave portion with which a part of the lock lever 6b comes in contact. By the above-mentioned state, the lock bottom 6a is not easily moved along the guide mechanism 3d.

As shown in FIG. 2D, if the lock bottom 6a is pressed to the inner side, the lock between the lock lever 6b and the outer case member 3 is released. At this time, the tongue member 6a2 is removed from the guide 3d1, and the lock bottom 6a can be easily moved along the guide groove 3d3 of the guide mechanism 3d. At this time, since the tongue member 6a1 is in contact with the guide 3d1, there is no case that the lock bottom 6a is buried into the inner side.

Operation of Disk Storage Unit

The following will explain an operation when the disk storage unit contained in the above-structured case unit 10 is mounted on the personal computer.

As shown in FIG. 2A, in the disk storage unit, HDD 1 is inserted to the inner case member 4 and the entire inner case member 4 is contained in the outer case member 3. At this time, HDD 1 is locked to the inner case member 4 by the first lock mechanism 5. Moreover, the inner case member 4 is locked to the outer case member 3 by the second lock mechanism 6. Therefore, HDD 1 is protected against the magnetic field and external impact by use of the case unit 10 having the double structure formed of the inner case member 4 and the outer case member 3.

Such a disk storage unit is moved to the position of the slot 55 of the computer body 51 as shown in FIG. 3, and an outlet side of the outer case member 3 is pressed to the slot 55. Then, the lock bottom 6a is pressed to the inner side of the outer case member 3 to release the lock state of the the second lock mechanism 6. Therefore, the inner case member 4 is in a movable state from the outer case 3.

In this state, the lock bottom 6a is pressed such that the inner case member 4 is guided along the guide groove 3d3 of the guide mechanism 3d and moved to the slot 55. In other words, the inner case member 4 is pushed out to the slot 55 from the inside of the outer case member 3. At this time, HDD 1 is fixed to the inner case member 4 by the first lock mechanism 5. Therefore, HDD 1 is pushed from the outer case member 3 along the movement of the inner case member 4, and is inserted into the slot 55.

Figure 4A:
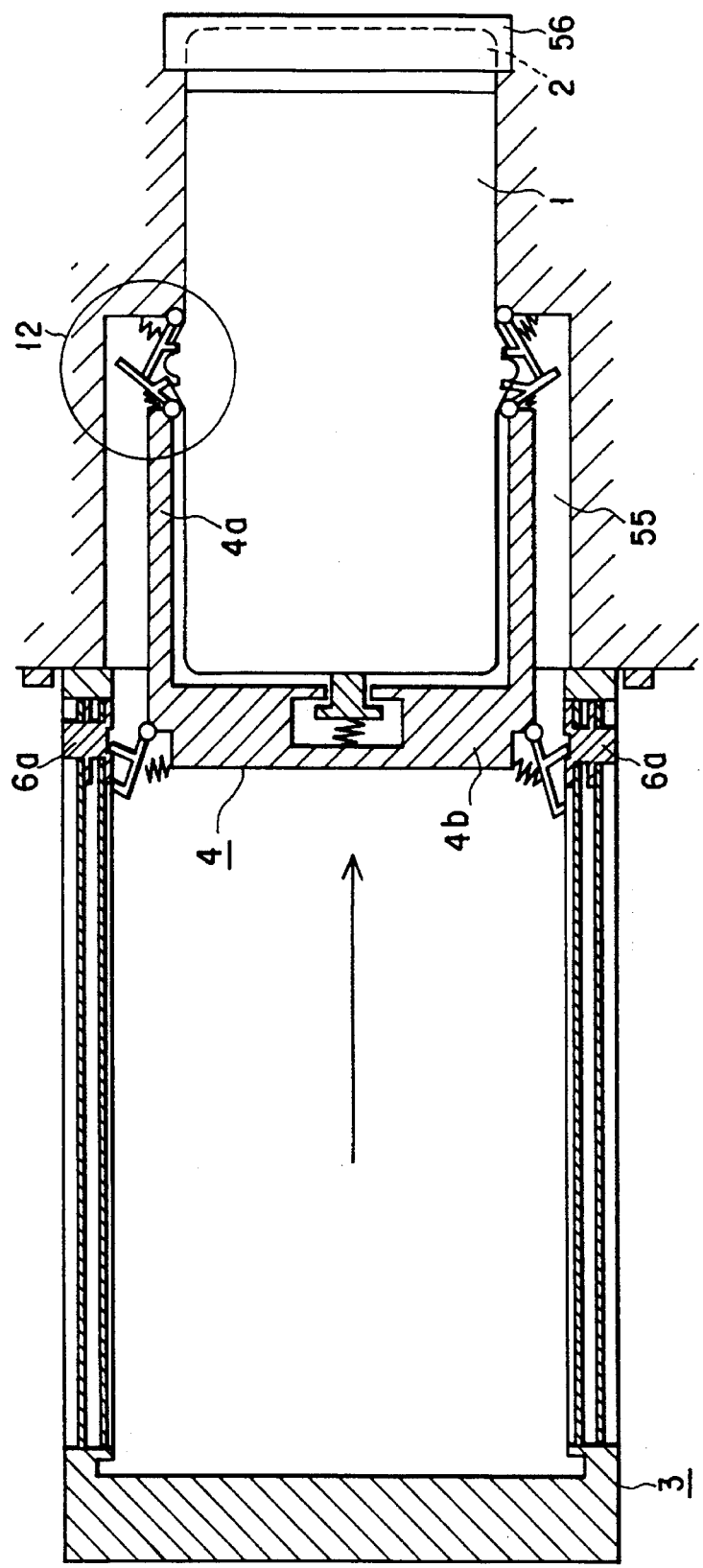
FIG. 4A is a plane view explaining an operation of a disk storage unit of the present invention.

If HDD 1 is completely inserted into the slot 55, as shown in FIG. 4A, the connector 2 of the top end portion and the connector 56 of the computer body 51 are coupled to be connected to each other. At this time, even if the inner case member 4 is pushed to the outside of the outer case member 3, the inner case member 4 is supported by the outer case member 3 by the second lock mechanism 6.

The lock state of the first lock mechanism 5 is released, so that HDD 1 mounted onto the slot 55 is released from the fixed state of the inner case member 4, and is set to be in a detachable state. A main body side lock mechanism 7, which is provided in the slot 55, and a disk side lock mechanism 8 are engaged with each other, so that HDD 1 removed from the inner case member 4 is fixed to the computer body 51.

The following will explain the first lock mechanism 5, main body side lock mechanism 7, and disk side lock mechanism 8 with reference to FIGS. 4A, 4B, and FIGS. 7A to 7E.

Figure 4B:
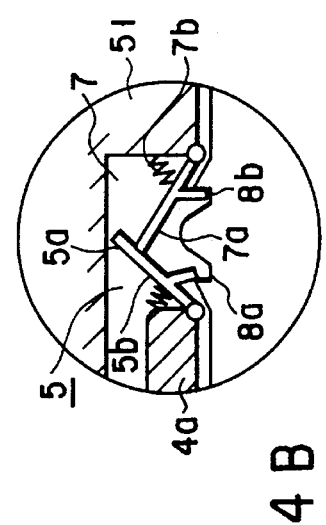
FIG. 4B is a partially enlarged viewed of FIG. 4A.

First of all, the disk side lock mechanism 8 comprises a pair of grooves 8a and 8b formed on the side surface portions (two portions) of HDD 1 as shown in FIG. 4B (enlarged view of portion 12 of FIG. 4A). The first lock mechanism 5 comprises a lock lever 5a provided in the side surface portion 4a of the inner case member 4 and a spring 5b as shown in FIG. 4B. In a state that HDD 1 is contained in the inner case member 4, the lock lever 5a is acted by the spring 5b to be engaged with the groove 8a of the disk side lock mechanism 8. Whereby, HDD 1 is locked to the inner case member 4 to be fixed.

On the other hand, the main body side lock mechanism 7 comprises a lock lever 7a provided in the slot 55 of the computer body 51 and a spring 7b. The first lock mechanism 5 and the main body side lock mechanism 7 are structured such that lock levers 5a and 7a are in contact with each other and mutually interlock when the inner case member 4 is inserted to the slot 55 as shown in FIG. 4B.

Figure 7A:
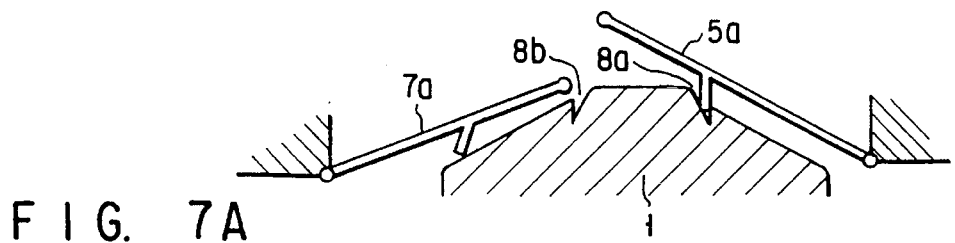
FIGS. 7A to 7E are conceptual views explaining the disk storage unit of the present invention.
Figure 7B:
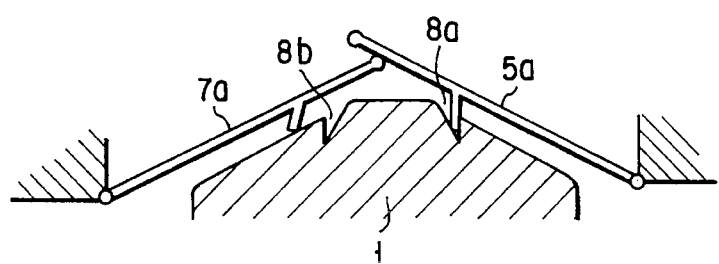
Figure 7C:
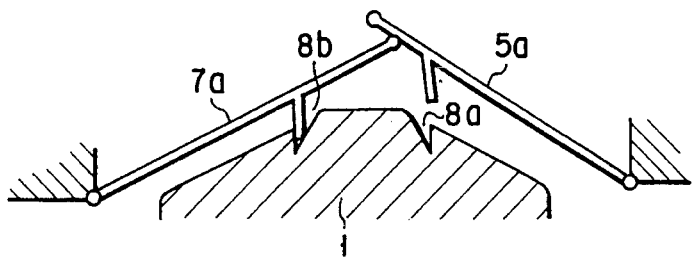

Before the lock levers 5a and 7a are in contact with each other, as shown in FIG. 7A, the lock lever 5a of the first lock mechanism 5 is engaged with the groove 8a of HDD 1, and HDD 1 is fixed to the inner case member 4 (lock state of the first lock mechanism 5). If the inner case member 4 is inserted to the innermost portion of the slot 55, the top end of the lock lever 7a contacts the lock lever 5a as shown in FIG. 7B. Then, as shown in FIG. 7C, the lock lever 7a detaches the lock lever 5a from the groove 8a of the disk side lock mechanism 8. In other words, the main body side lock mechanism 7 releases the lock of the the first lock mechanism 5. At this time, the lock lever 7a is engages with the groove 8b of the disk side lock mechanism 8 by force of the spring 7b. Therefore, in place of the first lock mechanism 5, HDD 1 is locked by the main body side lock mechanism 7, so that HDD 1 is locked by the computer body 51.

Figure 7D:
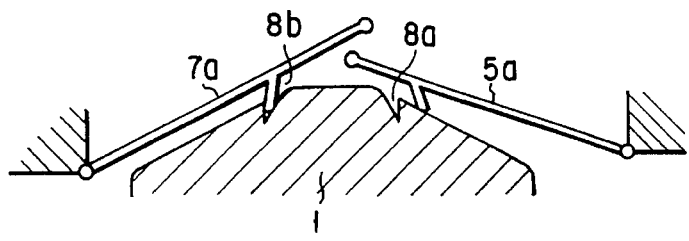
Figure 7E:
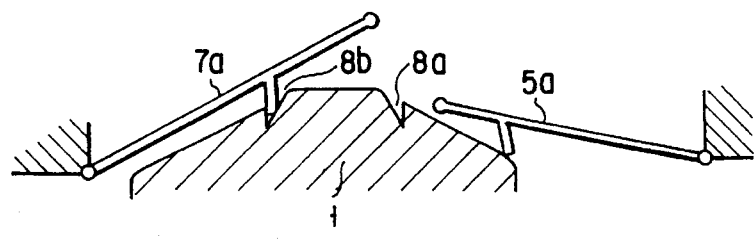

In this state, if the lock bottom 6a is pushed, the inner case member 4 is moved from the slot 55 to the inside of the outer case member 3, the lock lever 5a of the first lock mechanism 5 is removed from HDD 1 as shown in FIGS. 7D and 7E.

In this way, as shown in FIG. 5A, HDD 1 taken out from the inner case member 4 is in a state that HDD 1 is mounted onto the slot 55 of the computer body 51. The connector 2 and the connector 56 are coupled to each other, thereby HDD 1 is connected to the computer body 51. At this time, as shown in FIG. 4B, HDD 1 is in a state that HDD 1 is fixed to the inside of the slot 55 by the main body side lock mechanism 7.

On the other hand, for taking up HDD 1 from the slot 55, an operation, which is opposite to the above-mentioned operation, is performed. In this case, the outer case member 3 is approached to the insertion port of the slot 55, and the lock bottom 6a is pressed so that the inner case member 4 is inserted to the slot 55. In other words, there is set a state that no HDD 1 is provided in the inner case member 4 in FIG. 3.

If the inner case member 4 is inserted to the inside of the slot 55, the states of the lock levers 5a and 7a are changed from the state shown in FIG. 7E to the state shown in FIG. 7A. Therefore, if the lock levers 5a and 7a contact each other, and mutually interlock, the lock lever 5a detaches the lock lever 7a from the groove 8b, and is engaged with the groove 8a, thereby locking HDD 1. In other words, the first lock mechanism 5 releases the lock state of the main body side lock mechanism 7, and HDD 1 is locked.

The state of HDD 1, which is fixed to the slot 55 of the computer body 51, is released. Then, HDD 1 is contained in the inner case member 4, and fixed thereto. In this state, if the lock bottom 6a is pressed and the inner case member 4 is moved from the inside of the slot 55 to the inside of the outer case member 3, HDD 1 is removed from the connector 56 of the computer body 51, and taken out from the slot 55. Therefore, as shown in FIG. 2A, HDD 1 is used as a single disk storage unit contained in the case unit 10. Therefore, HDD 1 can be kept as a single unit as being contained in the case unit 10, or HDD 1 can be used as an outer storage apparatus of another computer body.

Figure 8A:
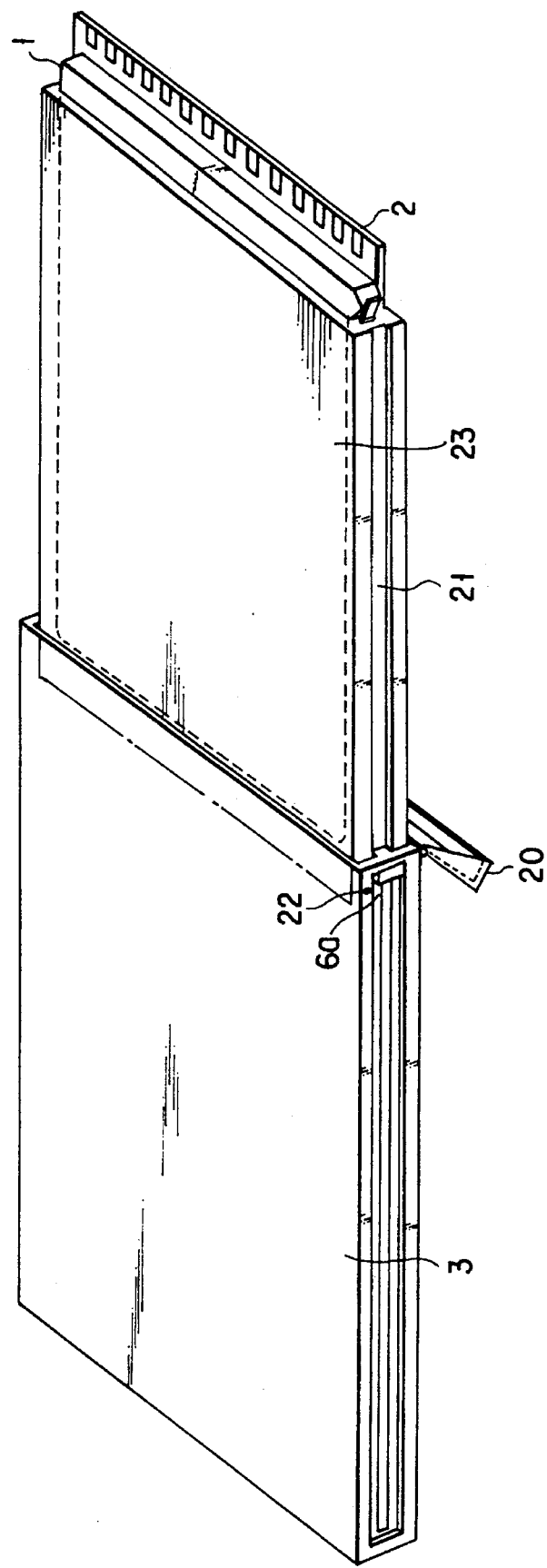
FIG. 8A is a perspective view showing an appearance of the disk storage unit of the present invention.
Figure 8B:
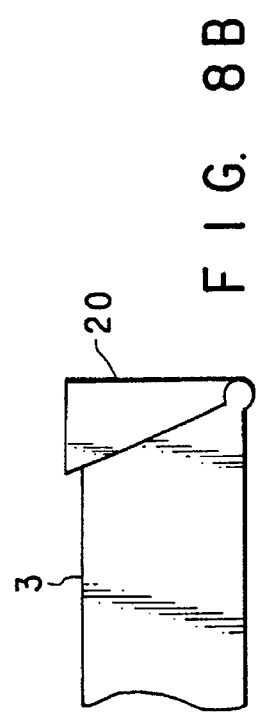
FIG. 8B is a partial side view showing an appearance of the disk storage unit of the present invention.

FIG. 8A shows a modification of the case unit of the first embodiment and that of the disk storage unit thereof. According to this modification, an inner case member 23 is structured to have a size enough to cover the entire of HDD 1 and no first lock mechanism 5. In the side surface portion of the inner case member 23, there is provided a guide rail 21 for guiding the inner case member 23 along the inner side of the outer case member 3. Also, a cover 20 is provided at an ejection port of the outer case member 3. The cover 20 is locked by a lock projection 22 formed in the side surface portion, and interrupts the outer unit.

In the above modification, since the first lock mechanism 5 is not used, the main body side lock mechanism 7 is not provided. Even if a lock mechanism corresponding to the main body side lock mechanism 7 is provided, the structure of such a lock mechanism is completely different from that of the lock mechanism 7. However, if HDD 1, which is small-sized and light-weight, is used, HDD 1 can be easily held in the slot 55 by coupling force of connectors 2 and 56.

As mentioned above, according to the present invention, since the disk storage apparatus such as HDD1 is contained in the case unit having the double-structure formed of the outer case member and the inner case member, the disk storage apparatus can be sufficiently protected against external impact or magnetic field from an outer unit when being carried. Moreover, HDD 1 can be connected to the computer body only by moving the inner case member to the inside of the slot of the computer body without taking out HDD 1 from the the inner case member. Therefore, a safety measure in dealing with HDD 1 can be sufficiently ensured, HDD 1 can be connected to the computer body by a simple operation, and HDD 1 can be contained in the case unit from the computer body.

Second Embodiment

FIG. 9 shows a case unit 30 of the second embodiment of the present invention, and a small-sized hard disk drive (HDD) 40, for example, HDD of 2.5 inch. Similar to HDD 1 of the first embodiment, in the second embodiment, there is used the disk storage unit serving as an external storage apparatus detachable from the personal computer 50.

HDD 40 is a small-sized apparatus having a plane size, which is substantially the same as that of a memory card, and a thickness, which is substantially the same as the thickness of two memory cards. In HDD 40, a carriage mechanism 44 for driving a disk rotation mechanism, which drives a disk 42, and a head 43 are built in a case 41 formed of an aluminum alloy, etc. On one surface of the side surface portion of the case 41, a key groove 45 is formed such that HDD 40 can be inserted to the case 30 from only a predetermined direction. The key groove 45 is shaped to be engaged with a key member 31 provided in the case unit 30.

Figure 15:
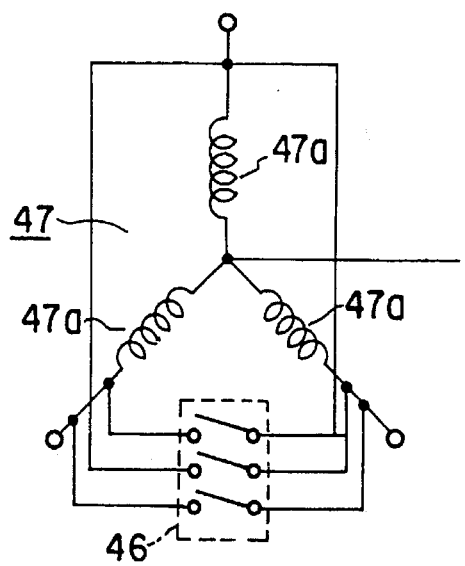
FIG. 15 is a circuit diagram of a spindle motor of the disk storage unit of the present invention.
Figure 16:
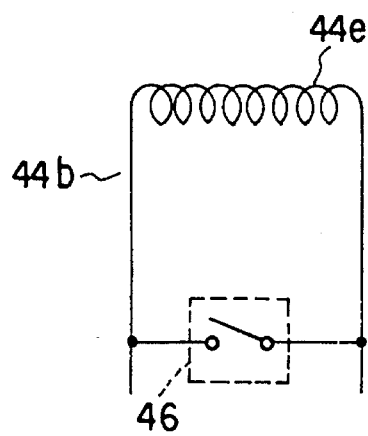
FIG. 16 is a circuit diagram of a voice coil motor of the disk storage unit of the present invention.

Moreover, in HDD 40, there is provided a lead switch 46 for forcibly stopping a spindle motor of the disk rotation mechanism and a voice coil motor (VCM) of the carriage mechanism 44 (See FIGS. 15 and 16). The lead switch 46 is a switch for performing an ON-operation by a magnetic field of a magnet. In this embodiment, the lead switch 46 is structured to be turned on by a magnetic field of a magnet 32 (disk lock member) provided in the case 30.

Structure of Case Unit 30

The case 30 comprises a case base 33 and a case cover 34 for covering the case base as shown in FIG. 9. Both case base 33 and the case cover 34 are made of material having light weight and rigidity such as plastic or light metal. The case base 33 is a case body having a width and a depth, which can contain HDD 40, sufficient structural strength, and a thickness H. The case base 33 comprises a bottom surface portion 33a, each side surface portion 33b, a rear surface portion 33c, and an upper surface portion 33. The bottom surface portion 33a is a surface for holding the inserted HDD 40. The side surface portion 33b is a guide surface having an inclined shape such that a rear portion is high and a front portion is low to easily contain HDD 40. The rear surface portion 33c is a surface contacting the side surface portion of the inserted HDD 40 in a case that input/output sides of HDD 40 is set as a front portion. The upper surface portion 33d is a surface covering a part of the plane of HDD 40 held by the bottom surface 33a, and is engaged with each of side surface portions 33b and the rear surface portion 33c.

The case cover 34 comprises each of side surface portions 34a having the same height as the side surface portion 33b of the case base 33, a front surface portion 34b, and an upper surface portion 34c covering the plane surface portion of HDD 40 held by the bottom surface 33a. The front surface portion 34b has a concave portion 34d corresponding to the thickness H of the bottom surface portion 33a of the case base 33. Then, the front surface portion 34b is a face opposing to the rear surface portion of the case base 33.

The case cover 34 is rotatably engaged with the case base 33 by a hinge mechanism 60 provided in each of the side surface portion 34a. FIGS. 11A, 11B are views enlarging the portion of the hinge mechanism 60. As shown in FIG. 11B, the hinge mechanism 60 comprises a cylindrical concave portion 60a, which is formed in the inner surface side of the side surface portion 34a of the case cover 34, and a convex portion 60b, which is formed in the outer surface side of the side surface portion 33b of the case base 33. The convex portion 60b has a cylindrical shape having a size conforming to the size of the concave portion 60a, and functions as a rotation shaft.

As shown in FIG. 9, the case cover 34 can be freely rotated to the case base 33 in a direction of an arrow B by the hinge mechanism 60, and a closing state that the case cover 34 covers the case base 33 (FIG. 10) and an opening state that the upper surface of the base base 33 is opened can be realized.

As shown in FIG. 10, if the closing state that the case cover 35 covers the case base 33 is set, the case cover 34 is locked to the case base 33 by a lock mechanism 61. The lock mechanism 61 comprises a cylindrical concave portion 61a formed on the inner surface side of each of the side surface portions 34a of the case cover 34, and a convex portion 61b formed on the outer surface side of the side surface portion 33b of the case base 33. FIGS. 12A and 12B show an enlarged portion of the lock mechanism 61. As shown in FIG. 12B, if the case cover 34 is closed to cover the case base 33, a convex portion 61b of the case base 33 is fitted to a concave portion 61a of the case cover 34, and the case cover 34 is locked. Since the lock mechanism 61 is a simple structure, if force is applied to the direction where the case cover 34 is opened, the convex portion 61b is removed from the concave portion 61a, and the locked state is released.

The case unit 30 not only contains HDD 40 but also an internal structure for relaxing vibration and impact from the outer unit. As shown in FIG. 13A (cross sectional view taken along line X—X of FIG. 10), in the case base 33, a large amount of shock absorbing materials 70 are provided on the inner surface where HDD 40 contacts. As the shock absorbing materials 70, there is used shock absorbing rubber (as a specific example, "ISODAMP" manufactured by EAR in U.S.) formed of rubber material such as butyul rubber. The surface of the shock absorbing material 70 is fluorinated to reduce frictional force, thereby making possible to smoothly contain the case unit 30 into the case unit 30. As shown in FIG. 13B (cross sectional view taken along line Y—Y of FIG. 10), the shock absorbing materials 70 are provided on the side surface portion 34a of the case cover 34 and the upper surface portion 34c.

When HDD 40 is contained in the case unit 30 by use of shock absorbing materials 70, HDD 40 is held in the case unit 30 through the shock absorbing materials 70. Therefore, since HDD 40 is not directly brought into contact with the inner surface of the case unit 30, impact provided onto HDD 40 is relaxed even if impact is applied to the case unit 30 by, for example, dropping.

Structure of HDD 40

The following will explain the inner structure of HDD 40 and a carriage lock member 71 provided in the case unit 30 with reference to FIGS. 14A (cross sectional view taken along line Y—Y of FIG. 10) and 14B (cross sectional view taken along line V—V of FIG. 14A).

As shown in FIG. 14A, HDD 40 comprises the disk 42, a spindle motor 47 for rotating the disk 42, and the carriage mechanism 44. The carriage mechanism 44 has an actuator 44a for holding the head 43 and a voice coil motor (VCM) 44b. The actuator 44a rotates around a rotational axis 44c by driving force of VCM 44b, so that the head 43 is moved to a radius direction of the disk 42.

As shown in FIG. 14B, VCM 44b has elements, i.e., a yoke 45a and a magnet 45b, and generates rotational driving force by an electromagnetic function of each element. In the general carriage mechanism 44, there is provided a carriage lock mechanism, which is formed of a convex portion 44d of a rear end portion of the actuator 44a and the magnet 45b of VCM 44b. In other words, a convex portion 44e is absorbed by the magnet 45b when HDD 40 is stopped, thereby maintaining the actuator 44a in a stop state.

In the above embodiment, as shown in FIGS. 14A and 14B, in the case unit 30, the carriage lock member 71 is provided in the vicinity of the convex portion 44d of the actuator 44a. By the carriage lock function using the carriage lock member 71, the carriage lock mechanism can be improved as compared with the conventional carriage lock mechanism.

The carriage lock member 71 has a a magnet 71b and a york (highly magnetic member) 71a constituting a magnetic circuit. A magnetic field is generated at both end portions of the york 71a, and the convex portion 44d of the actuator 44a is absorbed, so that the stop state of the actuator 44a is locked.

Moreover, the following will explain the inner structure of HDD 40 and a disk lock member 32 provided in the case unit 30 with reference to FIGS. 9, 15, and 16.

The disk lock member 32 is formed of a magnetic member. As shown in FIG. 9, when the case cover 34 is closed, the disk lock member 32 is provided at a position close to the lead switch 46 built in HDD 40.

As shown in FIGS. 15 and 16, HDD 40 has the lead switch 46, which forcibly stops each of the spindle motor 47 of the disk rotation mechanism and VCM 44b of the carriage mechanism 44 to be locked. The lead switch 46 is a switch for performing an ON operation by the magnetic field of the magnet.

According to this embodiment, when the case cover 34 is closed, the disk lock portion 32 approaches the lead switch 46. By the magnetic filed of the disk lock member 32, the lead switch 46 is turned on, and each coil 47a of the spindle motor 47 is shorted as shown in FIG. 15. Also, as shown in FIG. 16, the coil 44e of VCM 44b is shorted. Therefore, when the case cover 34 is closed, the stop state of the spindle motor 47 and that of VCM 44bm are maintained by the disk lock member 32. Therefore, the spindle motor 47 and VCM 44b are in a state that they are locked. When the case cover 34 is opened, the lead switch 46 is turned off, and both spindle motor 47 and VCM 44b are in an operatable state.

By providing such disk lock member 32, HDD 40 inserted to the case unit is surely locked. In this case, it is needed that HDD 40 be contained to approach the disk lock member 32. In other words, it is needed that the direction where HDD 40 is inserted to the case unit 30 be fixed.

Due to this, in this embodiment, as shown in FIG. 9, the key member 31 is provided in the case unit 30 in order to prevent the erroneous insertion of HDD 40. Moreover, the key groove 45 is formed on a predetermined side surface portion of the case 41 of HDD 40. If HDD 40 is inserted from a predetermined direction in advance, the key portion 31 is engaged with the key groove 45. Due to this, HDD 40 can be smoothly contained in the case unit. On the other hand, if HDD 40 is inserted from an opposite direction, the side surface portion of HDD 40 where no key groove 45 is formed collides with a corner portion 80, and HDD cannot be contained in the case unit.

Figure 17:
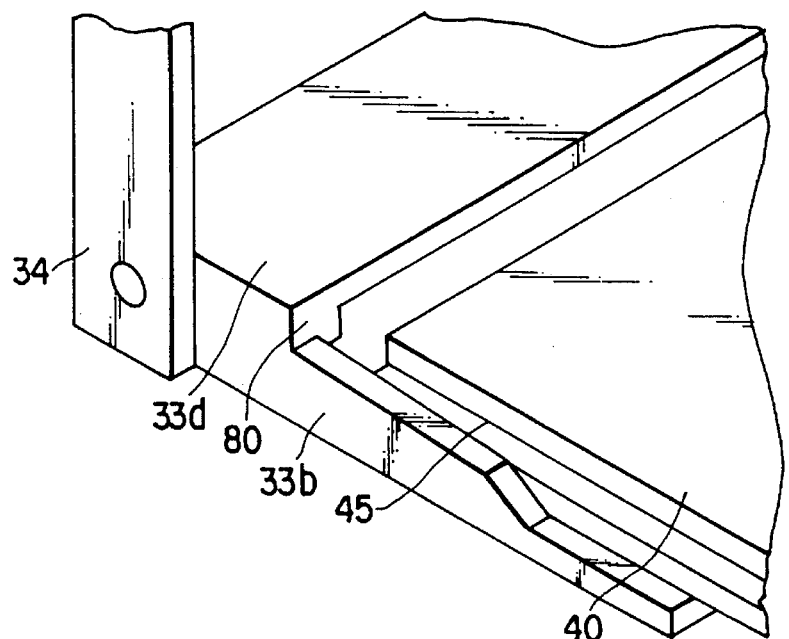
FIG. 17 is an exploded perspective view explaining the internal structure of the case unit of the present invention.

As shown in FIG. 17, the corner portion 80 corresponding to the key member 31 may be formed one end of the upper surface portion 33d of the case base 33. If the corner portion 80 is engaged with the key groove 45 of HDD 40, HDD 40 can be smoothly contained in the case unit 30. On the other hand, if HDD 40 is inserted from the opposite direction, the side surface portion of HDD 40 where no key groove 45 is formed collides with a corner portion 80, and HDD cannot be contained in the case unit.

Containing Operation of HDD 40

The following will explain the operation of containing HDD 40 in the case unit 30 in connection with the above-structured case unit 30 and HDD 40.

In a case that HDD 40 is not contained as shown in FIG. 10, it is assumed that the case cover 34 of the case unit 30 is closed. As shown in FIG. 9, the case cover 34 is opened, and the case base 33 is set to be an opening state. At this time, the case cover 34 is rotated by the hinge mechanism 60, and opened.

Then, the prepared HDD 40 is inserted to the case base 30. At this time, the key groove 45 is inserted in a predetermined direction such that the side surface portion where the key groove 45 is formed is the side the key member 31. If HDD 40 is inserted up to the rear surface portion 33c of the case base 33, the opened case cover 34 is closed, and HDD 40 is contained in the case unit 30.

In a state that HDD 40 is contained in the case unit 30, HDD 40 can be carried. In this case, HDD 40 is held by the shock absorbing materials 70 provided in the case unit 30 (FIGS. 13A and 13B). Therefore, even if the case unit 30 drops or other matter collides with the case unit 20, it is possible to relax impact exerted on HDD 40. Moreover, since the case cover 34 is locked to the case base 33 by the lock mechanism 61, there is not generated a case that the case cover 34 is opened by slight impact (FIGS. 12A and 12B).

Moreover, in the state that the case cover 34 is closed, the disk lock member 32 turns on the lead switch 46 built in HDD 40. Therefore, the operation of the spindle motor 47 of HDD 40 and the operation of VCM 44b are locked, and the stop state of the spindle motor 47 and that of the VCM 44b can be maintained. Also, by the carriage lock member 71, the carriage lock mechanism can be improved as compared with the conventional carriage lock mechanism.

By use of the case unit 20 of the above-mentioned embodiment, the disk storage apparatus can be protected against impact from an outer unit. Also, the driving mechanism having the spindle motor 47 and VCM 44b is locked, thereby making it possible to ensure safety in carrying HDD 40. Moreover, since HDD 40 is set to be an air-tight state by use of the case 30, HDD 40 can be protected against dust and contaminations from the outer unit.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A disk storage unit being removable from a computer body, the disk storage unit comprising:

connector means for connecting the computer body to a disk drive of the disk storage unit;

case means having an inner case member for containing the disk drive, an outer case member for containing the inner case member, and a guide mechanism for pushing out the inner case member from an inside of the outer case member to an outside of the outer case member, the inner case member having a case lock mechanism for removably holding the disk drive; and a disk lock mechanism for removably holding the disk drive to the computer body when the disk drive is connected to the computer body by the connector means, the disk lock mechanism releasing the case lock mechanism and locking the disk drive when the inner case member is pushed out from the inside of the outer case member to the outside of the outer case member.

2. The disk storage unit according to claim 1, wherein said case means has a case lock mechanism for removably fixing said disk drive contained in said inner case member to said inner case member, and said disk lock mechanism for releasing the lock of said case lock mechanism and removably fixing said disk drive to said computer body when said disk drive is connected to said computer body through said connector means.

3. The disk storage unit according to claim 1, wherein said case means has a first lock mechanism for removably fixing said disk drive contained in said inner case member to said inner case member and a second lock mechanism for removably fixing said inner case member to said outer case member, said disk lock mechanism for releasing the lock of said first lock mechanism and removably fixing said disk drive to said computer body when said disk drive is connected to said computer body through said connector means.

4. The disk storage unit according to claim 1, wherein the case lock mechanism comprises a first lever member provided at a top end portion of an insertion port of the inner case member for removably holding the disk drive in the inner case member, and wherein the disk lock mechanism comprises a second lever member which releases a lock state of the first lever member and locks the disk drive when the disk drive is connected to the computer body by the connector means.

5. The disk storage unit according to claim 4, further comprising:

a disk side lock mechanism, provided on a side surface portion of the disk drive, being engaged with the first lever member for locking in the inner case member, and being engaged with the second lever member for locking to the computer body.

* * * * *

UNITED STATES PATENT AND TRADEMARK OFFICE
CERTIFICATE OF CORRECTION

PATENT NO. : 5,587,854
DATED      : December 24, 1996
INVENTOR(S): Toshikuni SATO, et al.

It is certified that error appears in the above-indentified patent and that said Letters Patent is hereby corrected as shown below:

On the title page, Item [22], the filing date, should read:

--[22]  Filed:  Aug. 15, 1994--

Signed and Sealed this

Twenty-fifth Day of March, 1997

Attest:

BRUCE LEHMAN

*Attesting Officer*   *Commissioner of Patents and Trademarks*